UNITED STATES PATENT OFFICE.

FRANK B. SMITH AND GUILFORD C. GLYNN, OF IOLA, KANSAS.

REFRACTORY LINING FOR RETORTS.

No. 860,701.   Specification of Letters Patent.   Patented July 23, 1907.

Application filed November 23, 1906. Serial No. 344,727.

To all whom it may concern:

Be it known that we, FRANK B. SMITH and GUILFORD C. GLYNN, citizens of the United States, residing at Iola, in the county of Allen and State of Kansas, have invented a new and useful Improvement in Refractory Lining for Retorts, of which the following is a specification.

Our invention is in the nature of a new and improved retort lining and method of applying the same, said lining being intended primarily to be used for protecting retorts or ore muffles used in the distillation of zinc, from the action of corrosive slags at high temperatures, thereby prolonging the life of the retorts and making a saving in zinc.

In a number of the proposed methods of lining a retort or refractory body with a more refractory substance or compound, a serious fault has been in the employment of silicate of soda (water glass) or an alkali, or both, to act as a binding agent. In the lining herein described, this difficulty is overcome, as both alkalies and silicates are eliminated. This is very essential, as both classes of compounds are very injurious to the herein described lining, acting on it very energetically and soon causing its destruction.

It is a well known fact that water glass (silicate of soda) cannot be employed with carborundum at high temperatures, because of its power to combine, or flux the material under such conditions. Aside from this, the very fineness of the carborundum, prevents the successful use of water glass; as a quantity sufficient to cause the lining to adhere strongly to the walls of the retort or furnace, will cause a combination between the clay and the water glass, ending in the destruction of the clay supporting body. In the case of alkalies, aside from their strong affinity for carborundum at comparatively low temperatures, their well known fluxing power (the most energetic fluxes known) renders their use prohibitive, a discussion of their action is therefore unnecessary. It can readily be seen therefore that any binder composed of water glass, or an alkali, or an alkaline compound used in such a way would be extremely disastrous to the retort or other refractory material employed.

In our invention we employ carborundum or other similar inert material, and the method of its application is as follows.

To a solution of aluminium sulfate, containing about 40% $Al_2(SO_4)_3$ more or less, an equal amount of a magnesium salt, such as magnesium sulfate or chlorid is added, so that the whole solution is rather thick and viscid. In this solution is mixed, or suspended, a powdered substance consisting of some easily fusible compound of the alkaline earth metals, such as calcium fluorid. The whole mass now being of about the consistency of thick paint. This mixture is smeared with a brush, or other suitable means, on the exposed surface of the retort or furnace. The exposed surface may in this case, means either the inner or the outer surface of the retort, or both. After covering the entire surface this coating is allowed to dry before applying the second coating or layer of refractory material proper. The finely powdered carborundum, or other inert compound or substance, free from lumps, is mixed with a soluble chromium salt preferably chromic acid ($CrO_3$) of rather dilute strength (1% to 50%) to the consistency of a rather stiff paste, the whole being thoroughly incorporated so that a uniform mass is obtained. This paste is then applied to the surface which has already been treated with the first coating in a uniform layer of about 3/16 of an inch in thickness more or less. This application is made either by hand or any suitable mechanical means. After lining, the retort is allowed to stand until thoroughly dry, when it is placed in a retort, kiln, or furnace, and subjected to a gradually increasing temperature. When a red heat is reached a reaction begins to take place, the aluminum sulfate and magnesium sulfate form oxids with the expulsion of sulfuric acid, and unite with the calcium fluorid to form on further heating, at an increasing temperature, an enamel, which combines on one side with the clay of the retort, or other refractory body, and the lining on the other. This enamel on prolonged heating eventually becomes infusible and binds the lining and retort firmly together and in this state becomes inert and incapable of further combination. The chromic acid becomes, on heating, chromic oxid and combines with the particles of carborundum, probably by the formation of chromium silicid, holding the mass firmly together, and making a hard, compact lining, impervious to the passage of vapor and in this state unattacked by either acid or basic slags at the temperature commonly obtained in practice.

It will be understood that our invention may be applied to the treatment of separate bricks or blocks, or any other surfaces which are required to offer a resistance to heat in metallurgical operations.

In carrying out our invention we would state that we do not confine ourselves to the use of aluminium and magnesium salts in combination with an easily fusible compound of the alkaline earths for forming the binding enamel, as either the aluminium or magnesium salt alone may be used with the compound of alkaline earth, or even glue water might be substituted since the solutions of aluminium and magnesium salts act chiefly as carriers for the enamel forming binder of alkaline earth, the latter being the important ingredient.

We would also state that the external lining is not to be limited to the use of chromic oxid as an ingredient, as any neutral lining such as carborundum or other inert material may be combined with the intermediate layer of binder enamel, and unified therewith in the manner described.

We claim

1. A neutral lining for highly heated surfaces, comprising an inert refractory material mixed with chromic oxid.

2. A neutral lining for highly heated surfaces, comprising carborundum mixed with chromic oxid.

3. A neutral lining for retorts &c, comprising an inert refractory material mixed with chromic oxid, combined with an intermediate layer of enamel-forming material having an adhesive affinity both for the clay of the retort and the outer lining of inert material.

4. A neutral lining for retorts &c, comprising an inert refractory material mixed with chromic oxid, combined with an intermediate layer of enamel-forming material consisting of the oxids of aluminium and magnesium mixed with an easily fusible compound of the alkaline earths.

5. A neutral lining for retorts &c, comprising powdered carborundum mixed with chromic oxid, combined with an intermediate layer of enamel-forming material consisting of the oxids of aluminium and magnesium mixed with calcium fluorid.

6. A neutral lining for fire clay surfaces, consisting of an external coating of an inert refractory material combined with an intermediate layer of enamel forming material having an adhesive affinity for both the clay supporting body and the external refractory material.

7. A neutral lining for fire clay surfaces, consisting of an external coating of an inert refractory material combined with an intermediate layer comprising an easily fusible compound of an alkaline earth forming an enamel having an adhesive affinity for both the clay supporting body and the external refractory material.

8. A neutral lining for fire clay surfaces, consisting of an external coating of an inert refractory material containing carborundum, combined with an intermediate layer containing an easily fusible compound of an alkaline earth forming an enamel having an adhesive affinity for both the clay supporting body and the external refractory material.

9. The process herein described of lining fire clay surfaces which consists in first applying to the same a fluid coating of a fusible compound of an alkaline earth capable of forming an enamel under a high heat; then applying thereto an external coating of a neutral refractory material and then burning the same to cause an adhesive affinity between the enamel and fire clay on the one side and the enamel and external refractory material on the other side.

10. The process herein described of lining retorts &c. which consists in first applying a fluid coating of aluminium and magnesium salts mixed with an easily fusible compound of the alkaline earths capable of forming an enamel under a high heat, and applying an external coating of a refractory material combined with a chromium salt capable of forming chromic oxid at a high temperature and then burning the layers into a fixed and stable union to form a refractory lining.

11. The process of lining retorts &c which consists in first aplying a fluid coating of aluminium and magnesium salts mixed with the fluorid of calcium, then applying an external coating of carborundum and a chromium salt, then burning the same to effect the chemical union and mechanical adhesions of the stratified ingredients as described.

FRANK B. SMITH.
GUILFORD C. GLYNN.

Witnesses:
C. S. POTTER,
CHAS. B. SPENCER.